United States Patent
Cocco

[11] Patent Number: 5,352,751
[45] Date of Patent: Oct. 4, 1994

[54] PREPARATION OF END-ALKOXYLATED DIORGANOPOLYSILOXANES

[75] Inventor: Roger Cocco, Saint-Symphorien D'Ozon, France

[73] Assignee: Rhone-Poulenc Chimie, Courbevoie, France

[21] Appl. No.: 694,487

[22] Filed: May 2, 1991

Related U.S. Application Data

[63] Continuation-in-part of Ser. No. 431,788, Nov. 6, 1989, Pat. No. 5,079,324.

[30] Foreign Application Priority Data

May 2, 1990 [FR] France ............... 90/05756

[51] Int. Cl.$^5$ ............................................. C08G 77/08
[52] U.S. Cl. ....................................... 528/14; 528/20; 528/34; 528/39
[58] Field of Search ................. 528/14, 20, 34, 39

[56] References Cited

U.S. PATENT DOCUMENTS

| | | | |
|---|---|---|---|
| 2,634,252 | 4/1953 | Warrick | 528/14 |
| 3,383,355 | 5/1968 | Cooper | 528/14 |
| 4,177,200 | 12/1979 | Razzano et al. | 528/36 |
| 4,374,950 | 2/1983 | Shimizu | 528/20 |
| 4,532,315 | 7/1985 | Letoffé et al. | 528/14 |
| 5,079,324 | 1/1992 | Cocco et al. | 528/14 |
| 5,109,093 | 4/1992 | Rees et al. | 528/14 |
| 5,196,497 | 3/1993 | Weber et al. | 528/14 |

FOREIGN PATENT DOCUMENTS 0304701 3/1989 European Pat. Off.

OTHER PUBLICATIONS

Chemical Abstracts, vol. 90, No. 6, Feb. 1979, p. 27 39644w, Columbus, Ohio, USA & JP-A-78 118 500 (Toray Silicone Co., Ltd.) Oct. 16, 1978.

*Primary Examiner*—John C. Bleutge
*Assistant Examiner*—M. Glass
*Attorney, Agent, or Firm*—Burns, Doane, Swecker & Mathis

[57] ABSTRACT

Straight-chain diorganopolysiloxanes having alkoxy endgroups, well adapted for formulation into single-component polysiloxane compositions which are stable on storage in the absence of moisture, but which cross-link into elastomeric state in the presence of moisture, are prepared by reacting a dihydroxydiorganopolysiloxane with a polyalkoxysilane, and advantageously also with an alkanol, in the presence of a catalytically effective amount of sodium hydroxide or potassium hydroxide.

14 Claims, No Drawings

PREPARATION OF END-ALKOXYLATED DIORGANOPOLYSILOXANES

CROSS REFERENCE TO RELATED APPLICATION

This is a continuation-in-part of Ser. No. 431,788, filed Nov. 6, 1989, now U.S. Pat. No. 5,079,324, issued Jan. 7, 1992.

BACKGROUND OF THE INVENTION

1. Field of the Invention

The present invention relates to the preparation of diorganopolysiloxanes having alkoxy endgroups, designated PF (polymers containing functional groups) below, and to the use of such PF polymers as one of the essential constituents in single-component organopolysiloxane compositions which are stable in storage and in the absence of moisture, but which crosslink into elastomeric state under atmospheric humidity at ambient temperature, namely, cold-vulcanizable elastomer (CVE) compositions.

2. Description of the Prior Art

It is known to this art to prepare such PFs by reacting a dialkoxysilane, a trialkoxysilane or a tetraalkoxysilane with a diorganopolysiloxane oil comprising a hydroxyl group bonded to the silicon atom at each end of its polymer chain, but it is necessary to use a catalyst therefor. Indeed, numerous patents relate to the use of catalysts specifically for this reaction for the introduction of functional groups.

U.S. Pat. No. 3,542,901 describes an amine as the catalyst. This catalyst is effective, but the reaction is fairly slow (for example 15 to 30 min at 60° C. for fairly reactive alkoxysilanes such as $Si(OCH_3)_4$ or $ViSi(OCH_3)_3$). With alkoxysilanes of low reactivity, it is necessary to employ very much longer reaction times, or to attain only incomplete reaction. It is also known that the presence of residual silanols is generally adverse to the stability of the system (see U.S. Pat. No. 4,489,191-A and also French published Patent Application Nos. 2,597,876 and 2,597,877). Moreover, it is difficult to remove the amine completely, which may have an adverse effect on the stability of the composition on storage thereof; it may also cause the appearance of yellowish discolorations, either during storage of the mastic or on the crosslinked product.

It is for this reason that numerous other catalytic systems have been proposed to the art. The following are exemplary:

(i) Potassium acetate: U.S. Pat. No. 3,504,051;
(ii) Diverse inorganic oxides: FR 1,495,011;
(iii) Organic titanium derivatives: U.S. Pat. No. 4,111,890;
(iv) Titanate plus amine: U.S. Pat. No. 3,647,846;
(v) Alkoxyaluminum chelate: GB-A-2,144,758;
(vi) N,N'-Disubstituted hydroxylamine: FR-A-2,508,467;
(vii) Carboxylic acid plus amine: FR 2,604,713;
(viii) Carbamates: EP 0,210,402;
(ix) Organic compounds containing an oxime group: FR 2,597,875.

Certain of these catalysts are slightly more active than the amines, but it is nevertheless necessary to heat the reaction medium to 60° to 70° C. in order to provide times of 5 to 10 minutes for introduction of the functional groups. Moreover, these catalysts, or the residues thereof, may have an adverse influence on the stability of the particular composition on storage, in particular in the presence of setting or curing catalysts, as well as on the properties of the crosslinked products because it is difficult or impossible to remove them completely after reaction.

Published Patent Application FR 88/15,312, filed Nov. 7, 1988 and assigned to the assignee hereof, also describes a process for the preparation of diorganopolysiloxanes having alkoxy endgroups, using lithium oxide as the catalyst for the introduction of functional groups.

Another process for preparing oils containing functional groups (PF) entails the utilization of mixed silanes having, in addition to the alkoxy groups, a water-soluble group such as an amido, amino, carbamate or oxime group, etc., if appropriate in the presence of a known catalyst for the introduction of functional groups and a polyalkoxysilane.

Processes of this type are described, in particular, in U.S. Pat. Nos. 3,697,568 and 3,896,079 and in EP-A-69,256.

These processes are effective, but require the use of costly mixed silanes. Moreover, the organic products resulting from the water-soluble groups after reaction may have an adverse effect on the CVE composition (see in this regard pages 4 and 5 of FR-A-2,543,562).

SUMMARY OF THE INVENTION

Accordingly, a major object of the present invention is the provision of an improved process for the catalyzed functionalization of diorganopolysiloxanes, to prepare straight-chain diorganopolysiloxanes comprising at least one alkoxy group bonded to a silicon atom at each end of the polymer chain (PF polymers, or oils containing functional groups).

Another object of the present invention is the provision of certain catalysts for functionalizing diorganopolysiloxanes and which enable the PF to be obtained by carrying out the reaction at ambient temperature, in particular using $CH_3Si(OCH_3)_3$, $CH_2=CH-Si(OCH_3)_3$ or $MeViSi(OCH_3)_2$ as the agent for introducing functional groups (Me representing the methyl radical, $-CH_3$, and Vi representing the vinyl radical, $-CH=CH_2$).

Another object of the present invention is the provision of certain catalysts for introducing functional groups into diorganopolysiloxanes and which enable the PF to be obtained, at ambient temperature, in a time of less than 15 minutes, advantageously less than 10 minutes and preferably 5 minutes or less, in particular using one of the aforenoted crosslinking agents as the crosslinking agent.

Yet another object of this invention is the use of inexpensive catalysts which are available commercially (in the chemical industry) and which may be used, even in large amounts, during the reaction for the introduction of functional groups onto a diorganopolysiloxane substrate.

Still another object of this invention is the use of certain catalysts for introducing functional groups onto a diorganopolysiloxane substrate which may easily be neutralized upon completion of the functionalization reaction, in particular by a silyl phosphate.

Another object of the present invention is the use of certain catalysts for introducing functional groups onto a diorganopolysiloxane substrate which may be neutralized upon completion of the functionalization reaction, without presenting any requirement for the immediate or urgent neutralization thereof, namely, permitting initiation of neutralization, for example, one hour after the functionalization reaction has been completed.

Yet another object of this invention is the use of certain catalysts for introducing functional groups onto a diorganopolysiloxane substrate which, after neutralization thereof and, if appropriate, the devolatilization of the reaction mass upon completion of the functionalization reaction, to provide PF polymers (containing the reaction product resulting from neutralization of the catalyst) for cold-vulcanizable elastomer (CVE) compositions which are stable in storage in the absence of moisture and which crosslink into elastomeric state under atmospheric humidity at ambient temperature.

Such compositions present the advantage of not requiring the use of scavenger compounds to remove the final trace amounts of silanols, such as those described in EP 69,256, EP 104,179 and FR 2,543,562.

Briefly, the present invention features a process for the preparation of a straight-chain diorganopolysiloxane containing at least one alkoxy group bonded to a silicon atom at each end of the polymer chain, comprising reacting, in the presence of a catalytically effective amount of sodium hydroxide or potassium hydroxide, (a) 100 parts by weight of at least one straight-chain diorganopolysiloxane containing a hydroxyl group bonded to a silicon atom at each end of its polymer chain, with (b) 0.35 to 6 parts by weight of at least one polyalkoxysilane of the formula:

$$(R^4)_c(R^1)_a Si(OR^2)_{4-(a+c)} \quad (1)$$

in which a is 0, 1 or 2; c is 0, 1 or 2; a+c is 0, 1 or 2; $R^1$ is a substituted or unsubstituted, saturated or unsaturated, $C_1$ to $C_{13}$ aliphatic, cycloalkyl or aromatic monovalent hydrocarbon radical, which may include an epoxy, primary, secondary or tertiary amine or mercapto group; the radicals $R^2$, which may be identical or different, are each an aliphatic organic radical having from 1 to 8 carbon atoms, in particular an alkyl radical, alkyl ether radical, alkyl ester radical, alkyl ketone radical or alkyl cyano radical, or an aralkyl radical having from 7 to 13 carbon atoms; and $R^4$ is a substituted or unsubstituted, saturated or unsaturated, $C_1$ to $C_{13}$ aliphatic, cycloalkyl or aromatic monovalent hydrocarbon radical, with the proviso that $R^4$ may be identical to $R^1$, and (c) 0.5 to 15 parts by weight of at least one alcohol, preferably methanol.

This invention also features a process for the preparation of a straight-chain diorganopolysiloxane containing at least one alkoxy group bonded to a silicon atom at each end of its polymer chain, comprising reacting, in the presence of a catalytically effective amount of sodium hydroxide or potassium hydroxide, (a) one mole of at least one diorganopolysiloxane containing a hydroxyl group bonded to a silicon atom at each end of its polymer chain, with (b) 2 to 6 moles of at least one polyalkoxysilane of the formula:

$$(R^4)_c(R^1)_a Si(OR^2)_{4-(a+c)} \quad (1)$$

in which a is 0, 1 or 2; c is 0, 1 or 2; a+c is 0, 1 or 2; $R^1$ is a substituted or unsubstituted, saturated or unsaturated, $C_1$ to $C_{13}$ aliphatic, cycloalkyl or aromatic monovalent hydrocarbon radical; the radicals $R^2$, which may be identical or different, are each an aliphatic organic radical having from 1 to 8 carbon atoms, in particular an alkyl radical, alkyl ether radical, alkyl ester radical, alkyl ketone radical or alkyl cyano radical, or an aralkyl radical having from 7 to 13 carbon atoms; and $R^4$ is a substituted or unsubstituted, saturated or unsaturated, $C_1$ to $C_{13}$ aliphatic, cycloalkyl or aromatic monovalent hydrocarbon radical, with the proviso that $R^4$ may be identical to $R^1$.

DETAILED DESCRIPTION OF THE PREFERRED EMBODIMENTS OF THE INVENTION

More particularly according to the present invention, the two embodiments featured stem from the determination that during the introduction of functional groups into the polydiorganosiloxanes by the alkoxysilanes, using strong alkaline catalysis, the resulting functional polymers are subject to various degradation reactions. By an in-depth kinetic study of these various reactions, it has now been found that under certain conditions these adverse degradation reactions may be substantially retarded.

Thus, the stronger the base used as the catalyst, the more the amount of polyalkoxysilanes that may be present, in synergism with the catalyst, which is a predominant parameter in the degradation of the functional polymers. It is for this reason that one mole of a diorganopolysiloxane containing a hydroxyl group bonded to a silicon atom at each end of its polymer chain is reacted with 2 to 6 moles of at least one polyalkoxysilane of formula (1), by reason of the fact that only one of the alkoxy groups of a polyalkoxysilane reacts with a silanol group of a diorganopolysiloxane, which corresponds to one to three times the stoichiometric amount.

An excess of polyalkoxysilanes increases the rate of the degradation reactions; by "excess of polyalkoxysilanes" is intended an amount of such polyalkoxysilanes which is 3 times higher than the stoichiometric amount. However, the degradation reactions may be distinctly retarded when at least one alcohol, for example a lower alkanol such as methanol, ethanol and propanol, whether individually or in admixture, is present in the reaction mixture, in an amount advantageously ranging from 0.5 to 15 parts by weight, preferably from 2 to 5 parts by weight, per 100 parts by weight of at least one polydiorganopolysiloxane.

In actual practice, an alcohol is preferably used which has a boiling point of less than or equal to 100° C.

The present invention also features the incorporation of the straight-chain diorganopolysiloxanes prepared by the process of the invention, in particular those containing at least two alkoxy groups at each end of the polymer chain, into single-component polysiloxane compositions which are stable on storage in the absence of moisture, but which crosslink into elastomeric state in the presence of moisture.

The diorganosiloxanes containing at least one alkoxy group at each end of their polymer chain have the formula:

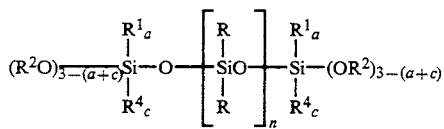

(2)

and the diorganopolysiloxane containing a hydroxyl group at each end of its polymer chain has the formula:

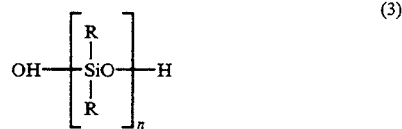

(3)

in which $R^1$, $R^2$ and $R^4$ are as defined above in connection with the silane of formula (1); the radicals R, which may be identical or different, are each a monovalent hydrocarbon radical having from 1 to 10 carbon atoms, which may be substituted by halogen atoms or cyano groups; preferably, the radicals R are selected from among methyl, phenyl, vinyl and 3,3,3-trifluoropropyl radicals; a is 0, 1 or 2; c is 0, 1 or 2; a+c is 0, 1 or 2; and n is a number having a value such that the polymers of formulae (2) and (3) have a viscosity of 25 to 1,000,000 mPa.s at 25° C., with the proviso that the polysiloxane of formula (2) may have an average formula in which the value of n is higher or lower than the value of n in the diorganopolysiloxanes (3) reactive with the silane of formula (1).

Exemplary of such radicals R are:
(i) alkyl and halogenoalkyl radicals having from 1 to 10 carbon atoms, such as methyl, ethyl, propyl, isopropyl, butyl, pentyl, hexyl, 2-ethyl hexyl, octyl, decyl, 3,3,3-trifluoropropyl, 4,4,4-trifluorobutyl or 4,4,4,3,3-pentafluorobutyl radicals;
(ii) cycloalkyl and halogenocycloalkyl radicals having from 1 to 10 carbon atoms, such as cyclopentyl, cyclohexyl, methylcyclohexyl, propylcyclohexyl, 2,3difluorocyclobutyl or 3,4-difluoro-5-methylcycloheptyl radicals;
(iii) alkenyl radicals having from 2 to 4 carbon atoms, such as vinyl, allyl or but-2-enyl radicals;
(iv) monocyclic aryl and halogenoaryl radicals having from 6 to 10 carbon atoms, such as phenyl, tolyl, xylyl, chlorophenyl, dichlorophenyl or trichlorophenyl radicals; and
(v) cyanoalkyl radicals, in which the alkyl moieties have from 2 to 3 carbon atoms, such a β-cyanoethyl and β-cyanopropyl radicals.

The following are representative examples of $R_2SiO$ structural units comprising the alpha, omega-dihydroxydiorganopolysiloxane of formula (3):
$(CH_3)_2SiO$,
$CH_3(CH_2=CH)SiO$
$CH_3(C_6H_5)_2SiO$
$(C_6H_5)_2SiO$
$CF_3CH_2CH_2(CH_3)SiO$
$NC—CH_2CH_2(CH_3)SiO$
$NC—CH(CH_3)CH_2(CH_2=CH)SiO$
$NC—CH_2CH_2CH_2(C_6H_5)SiO$ It will of course he appreciated that according to the present invention a mixture of alpha, omega-di(hydroxy)diorganopolysiloxane polymers which differ from one another in respect of their molecular weights and-/or the nature of the radicals bonded to the silicon atoms may he used as the polymer of formula (3). It should also be appreciated that the polymer of formula (3) may optionally comprise monoorganosiloxy $RSiO_{1.5}$ and/or $SiO_2$ structural units, in a proportion of at most 2% relative to the number of diorganosiloxy units $R_2SiO$.

These alpha, omega-di (hydroxy) diorganopolysiloxane polymers are available commercially; in addition, they are easily produced in accordance with techniques which are now well known.

Exemplary of the polyalkoxysilanes of the formula $(R^4)_c(R^1)_aSi(OR^2)_{4-(a+c)}$ which may he used to carry out the process according to the present invention, the following are particularly representative:

$Si(OCH_3)_4$  $Si(OCH_2CH_3)_4$  $Si(OCH_2CH_2CH_3)_4$  $(CH_3O)_3SiCH_3$ $(C_2H_5O)_3SiCH_3$  $(CH_3O)_3SiCH=CH_2$  $(C_2H_5O)_3SiCH=CH_2$ $(CH_3O)_3SiCH_2—CH=CH_2$  $(CH_3O)_3Si[CH_2—(CH_3)C=CH_2]$ $(C_2H_5O)_3Si(OCH_3)$  $Si(OCH_2—CH_2—OCH_3)_4$ $CH_3Si(OCH_2—CH_2—OCH_3)_3$  $CH_2=CHSi(OCH_2CH_2OCH_3)_3$ $C_6H_5Si(OCH_3)_3$  $C_6H_5Si(OCH_2—CH_2—OCH_3)_3$

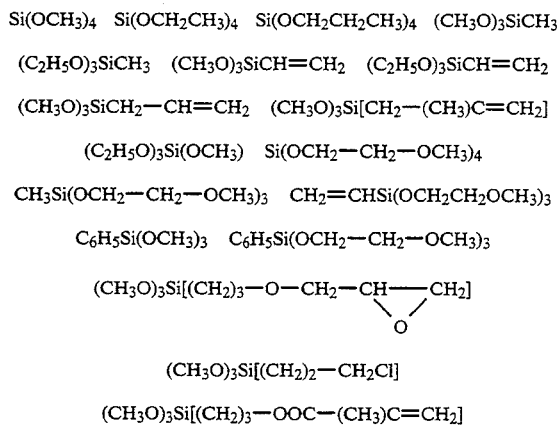

$(CH_3O)_3Si[(CH_2)_2—CH_2Cl]$ $(CH_3O)_3Si[(CH_2)_3—OOC—(CH_3)C=CH_2]$

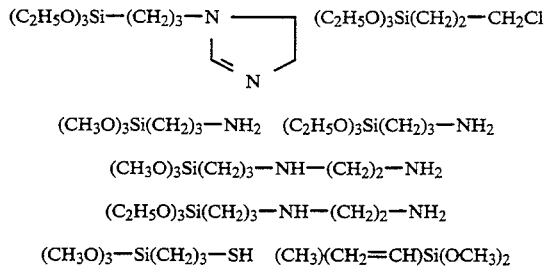

$(CH_3O)_3Si(CH_2)_3—NH_2$  $(C_2H_5O)_3Si(CH_2)_3—NH_2$ $(CH_3O)_3Si(CH_2)_3—NH—(CH_2)_2—NH_2$ $(C_2H_5O)_3Si(CH_2)_3—NH—(CH_2)_2—NH_2$

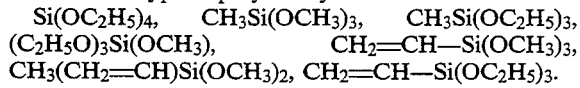

The most typical polyalkoxysilanes are:
$Si(OC_2H_5)_4$, $CH_3Si(OCH_3)_3$, $CH_3Si(OC_2H_5)_3$, $(C_2H_5O)_3Si(OCH_3)$, $CH_2=CH—Si(OCH_3)_3$, $CH_3(CH_2=CH)Si(OCH_3)_2$, $CH_2=CH—Si(OC_2H_5)_3$.

As regard the sodium hydroxide or potassium hydroxide used as the catalyst, both are widely available commercially; their formulae are, respectively, NaOH and KOH. When the reaction mixture does not contain alcohol, the sodium hydroxide or potassium hydroxide is preferably used as a solution in an alcohol, such as methanol or ethanol; the amount of alcohol present is then negligible. In general, an amount of alcohol ranging from 2 to 4 times the amount by weight of sodium hydroxide or potassium hydroxide is used.

By "catalytically effective amount" of sodium hydroxide or potassium hydroxide is intended an amount such that the rate of reaction is appreciably increased, in particular using $CH_3Si(OCH_3)_3$, $CH_2=CH—Si(OCH_3)_3$ or $MeViSi(OCH_3)_3$ as the agent for introducing the functional groups. In the majority of cases, from 0.001 to 5 moles of sodium hydroxide or potassium hydroxide is used per 1 mole of silanol group —SiOH in the polydiorganopolysiloxane of formula (3), it being appreciated that in order to provide 1 mole of SiOH, 0.5 mole of polydiorganopolysiloxane of formula (3) is required.

The temperature of the reaction according to the present invention advantageously ranges from −10° C. to 90° C. and preferably from 10° C. to 50° C.

The process according to the present invention is carried out in the absence of moisture, for example in a closed reactor which is fitted with a stirrer and in which a vacuum has been established and the expelled air is then replaced by an anhydrous gas, for example nitrogen.

The reactants and the catalyst are charged into the reactor and when the reaction for the introduction of the functional groups is complete the catalyst is neutralized and the reaction mass obtained is devolatilized to remove the alcohol formed during the functionalization reaction and the excess of agent for introducing functional groups (namely, the silane of formula (1)).

Numerous compounds may be used to neutralize the catalyst for introducing the functional groups (sodium hydroxide or potassium hydroxide), for example trichloroethyl phosphate or dimethylvinylsilyl acetate. However, it is preferred to use a silyl phosphate, such as, for example, those described in French Patent No. 2,410,004.

The devolatilization is carried out, for example, under an absolute pressure ranging from 133 to 13332 pascals.

The present invention also features the use of the diorganopolysioxanes thus produced, in particular those containing at least two alkoxy groups at each end of the polymer chain, for the preparation of single-component polysiloxane compositions which are stable on storage in the absence of moisture, but which crosslink into elastomeric state in the presence of moisture.

These compositions are produced by admixing (by weight):

(a) 0 to 250 parts of inorganic fillers;
(b) 0 to 20 parts, preferably 0 to 10 parts, of at least one additive selected from among aminoorganosilanes, aminoorganopolysiloxanes and guanidinoorganosilanes simultaneously bearing, per molecule:
  (i) at least one $C_3$–$C_{15}$ organic radical bonded via a SiC bond to the silicon atom and substituted by at least one amino radical or one guanidino radical, and
  (ii) at least one $C_1$–$C_5$ alkoxy radical or a $C_3$–$C_6$ alkoxyalkyleneoxy radical; and
(c) an effective amount of condensation catalyst to 100 parts of the functional polymer of formula (2) prepared by the process of the present invention (containing the product from the neutralization of sodium hydroxide or potassium hydroxide).

By "effective amount of condensation catalyst" is intended, for example, from 0.001 to 1 part by weight of at least one compound of a metal typically selected from among tin, titanium and zirconium, and mixtures thereof.

Exemplary condensation catalysts include tin monocarboxylates and dicarboxylates, such as tin 2-ethylhexanoate, dibutyltin dilaurate or dibutyltin diacetate (see NOLL, Chemistry and Technology of Silicones, 2nd Edition, page 337, Academic Press (1968).

The hexacoordinated chelates of tin of valency IV, such as those described in EP-A-147,323 and U.S. Pat. No. 4,517,337, are particularly useful.

The preferred condensation catalysts also include mixtures of a diorganotin bis(β-diketonate) with an organic derivative of tin, also of valency IV, but devoid of any β-diketonato group and possessing at least one tin atom, each tin atom bearing two organic radicals bonded by a Sn—C bond, the other two valencies being satisfied by radicals selected from among organic or inorganic radicals bonded by a SnO or SnS bond, by halogen atoms, by hydroxyl groups and by oxygen atoms.

These organic derivatives of tin of valency IV which are devoid of any β-diketonato group include, in particular, tin salts of the formulae:

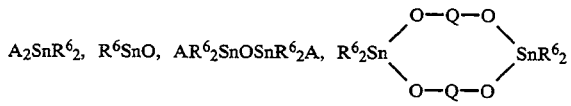

$A_2SnR^6_2$, $R^6SnO$, $AR^6_2SnOSnR^6_2A$, $R^6_2Sn$ in which $R^6$ is a $C_1$–$C$—$_{20}$ hydrocarbon radical, which may or may not be halogenated; A is an organic or inorganic radical bonded to the tin atom via a Sn—O or Sn—S bond, or a halogen atom; and Q is a $C_2$–$C_{10}$ alkylene radical.

A may be selected from the group comprising:
(i) monocarboxylate radicals of the formula $R^7COO$, wherein $R^7$ is a $C_1$–$C_{20}$ hydrocarbon radical, which may or may not be halogenated;
(ii) dicarboxylate radicals of the formula:

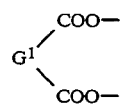

p1 bonded to a single tin atom or to two tin atoms, providing the two formulae:

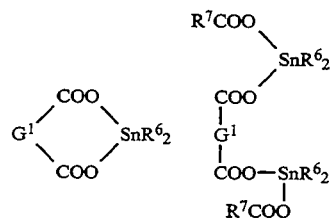

in which $G^1$ is a divalent $C_1$–$C_{15}$ hydrocarbon radical and $R^7$ is as defined under (i); and
(iii) dicarboxylate radicals of the formula $R^7OCOG^1$-COO, in which $R^7$ and $G^1$ are as defined, respectively, under (i) and (ii).

The above tin salts are well known to this art and are described, in particular, in the NOLL text indicated above, the U.S. Pat. Nos. 3,186,963 and 3,862,919, Belgian Patent 842,305 and British Patent GB-A-1,289,900 hereby expressly incorporated by reference.

The inorganic fillers are used in an amount ranging from 0 to 250 parts, preferably from 5 to 200 parts, per 100 parts of the PF of formula (2).

These fillers may be in the form of very finely divided materials, the average particle diameter of which is less than 0.1 micrometer. These fillers include silicas produced by combustion and silicas produced by precipitation; their BET specific surface area is generally larger than 40 m²/g.

These fillers may also be in the form of more coarsely divided materials having an average particle diameter of more than 0.1 micrometer. The following are exemplary such fillers: ground quartz, diatomaceous silicas, calcium carbonate, calcined clay, titanium dioxide of the rutile type, iron, zinc, chromium, zirconium and magnesium oxides, the various forms of alumina (hydrated or nonhydrated), boron nitride, lithophone, barium metaborate, barium sulfate and glass microspheres; their specific surface area is generally less than 30 m²/g.

These fillers may have been surface-modified by treatment with the various organosilicon compounds typically used for this application. Thus, these organosilicon compounds may be organochlorosilanes, diorganocyclopolysiloxanes, hexaorganodisiloxanes, hexaorganodisilazanes or diorganocyclopolysiloxanes (French Patent FR-A-1,126,884, FR-A-1,136,885, FR-A-1,236,505; British Patent GB-A-1,024,234. In the majority of cases, the treated fillers contain from 3% to 30% of their weight of organosilicon compounds.

The fillers may comprise a mixture of several types of fillers of different particle sizes; thus, for example, they may comprise 30% to 70% of finely divided silicas having a BET specific surface area of greater than 40 m²/g and 70% to 30% of more coarsely divided silicas having a specific surface area of less than 30 m²/g.

In order to improve, in particular, the adherence of the CVEs, the compositions according to the invention may optionally also contain from 0 to 20 parts, preferably from 1 to 15 parts, of at least one additive selected from among aminoorganosilanes, aminoorganopolysiloxanes and guanidinoorganosilanes simultaneously bearing, per molecule:

(i) at least one $C_3$-$C_{15}$ organic radical bonded via a SiC bond to the silicon atom and substituted by at least one amino radical or one guanidino radical, and (ii) at least one $C_1$-$C_5$ alkoxy radical or one $C_3$-$C_6$ alkoxyalkylene radical.

These additives and the use thereof are described, in particular, in U.S. Pat. Nos. 2,574,311, 2,832,754, 2,930,809, 2,971,864, 3,341,563, 3,686,375 and 4,180,642.

Among such additives, the silanes of the formulae:
H₂N(CH₂)₃Si(OC₂H₅)₃
H₂N(CH₂)₃Si(OCH₃)₃
H₂N(CH₂)₂NH(CH₂)₃Si(OCH₃)₃
are particularly representative.

Preferred adherence promoters are the silanes of the formula:

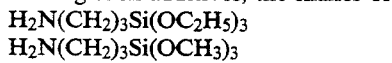

in which Y is an alkyl or alkoxy radical having from 1 to 4 carbon atoms, inclusive, at least two of the radicals Y being alkoxy radicals, Y', which may be identical or different, are selected from a hydrogen atom and an alkyl radical having from 1 to 3 carbon atoms, inclusive, and m is an integer ranging from 3 to 10, inclusive.

Exemplary silanes are:

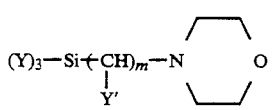

gamma-morpholinopropyltrimethoxysilane

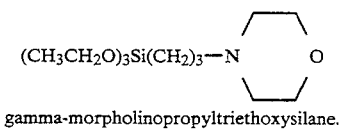

gamma-morpholinopropyltriethoxysilane.

These compounds and a process for their preparation are described by John L. SPEIER, *J. Org. Chem.*, Vol. 36, No. 21, page 3, 120 (1971).

In order to further illustrate the present invention and the advantages thereof, the following specific examples are given, it being understood that same are intended only as illustrative and in nowise limitative.

In said examples to follow, as in the above description, all parts and percentages are given by weight, unless otherwise indicated.

Also in said examples to follow, $\overline{M}n$ represents the number-average molecular weight, and $\eta$ represents the viscosity expressed in mPa.s.

EXAMPLE 1:

100 g of an α, ω-dihydroxypolydimethylsiloxane having a viscosity $\eta$ of 175,000 mPa.s at 25° C. and an $\overline{M}n$ of 75,000 and containing 450 ppm of hydroxyl groups (0.0026 SiOH units per 100 g of polymer) were introduced into a reactor.

Anhydrous nitrogen was also introduced into this reactor and, with stirring, 1 g (0.0067 mol) of vinyltrimethoxysilane and 0.0160 g (0.0004 mol) of sodium hydroxide of formula NaOH were introduced at ambient temperature (25° C.).

The mixture was permitted to react for 1 hour at a temperature of 25° C. and was then neutralized with 0.218 g of silyl phosphate which had a phosphoric acid equivalent content of 12.5% and was prepared in accordance with Example 2 of French Patent No. 2,410,004.

After devolatilization of the alcohol formed (under 16 ×133.32 pascals), an oil was obtained which had a viscosity $\eta$ of 178,000 mPa.s at 25° C. ¹H NMR, ²⁹Si NMR and IR analyses evidenced that this oil was devoid of silanol groups and that it had the structure of the formula:

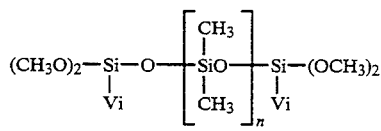

An intermediate determination evidenced that after a reaction time of 7 minutes, already no silanol groups existed.

COMPARATIVE EXAMPLE 2:

The procedure of Example 1 was repeated, changing only the amount of vinyltrimethoxysilane introduced: 5 g (0.034 mol), namely, an excess thereof.

After a reaction time of 1 hour at a temperature of 25° C., it was found that the silanol groups had disappeared, but the viscosity of the polymer obtained was no higher than 15,000 mPa.s at 25° C.

The degradation reactions of the polymer containing functional groups had substantially reduced the viscosity of the latter.

EXAMPLE 3:

The procedure of Example 1 was repeated, replacing the sodium hydroxide introduced by 0.0080 g (0.00014 mol) of potassium hydroxide, of formula KOH, and neutralizing the potassium hydroxide, after a reaction time of 1 hour, with 0.076 g of silyl phosphate (12.5% expressed as phosphoric acid).

The oil obtained had a viscosity of $\eta$ of 120,000 mPa.s at 25° C.

$^1$H NMR, $^{29}$Si NMR and IR analyses evidenced that this oil was devoid of silanol groups.

COMPARATIVE EXAMPLE 4:

The procedure of Example 1 was repeated, replacing the sodium hydroxide by 0.0080 g (0.00014 mol) of potassium hydroxide and changing the amount of vinyltrimethoxysilane: 2.5 g(0.017 mol), namely, an excess thereof; and the potassium hydroxide being neutralized, after a reaction time of 1 hour, with 0.076 g of silyl phosphate (12.5% expressed as phosphoric acid).

After reaction time of 1 hour at a temperature of 25° C., it was found that the silanol groups had disappeared, but the viscosity of the polymer obtained was 20,000 mPa.s at 25° C.

The degradation reactions of the polymer containing functional groups had substantially reduced the viscosity of the latter.

EXAMPLE 5:

The procedure was as in Comparative Example 4, but adding 2.5 g (0.017 mol) of methanol to the reaction mixture.

After reaction time of 1 hour, the polymer obtained had a viscosity $\eta$ of 140,000 mPa.s at 25° C. and the polymer was devoid of silanol groups.

EXAMPLE 6:

The procedure was as in Example 1, introducing:
(i) 100 g of $\alpha,\omega$-dihydroxypolydimethylsiloxane,
(ii) 2.5 g (0.017 mol) of vinyltrimethoxysilane (excess)
(iii) 0.016 g (0.0004 mol) of sodium hydroxide, and
(iv) 2.5 g (0.078 mol) of methanol.

The mixture was permitted to react for 1 hour and was then neutralized.

After devolatilization of the excess vinyltrimethoxysilane and the alcohol, an oil was obtained which had a viscosity $\eta$ of 128,000 mPa.s at 25° C. and a number-average molecular weight $\overline{M}n=73,000$.

$^1$H NMR, $^{29}$Si NMR and IR analyses evidenced that the introduction of functional groups into this oil was complete: absence of silanol groups.

COMPARATIVE EXAMPLE 7:

The procedure was as in Example 6, but not introducing the methanol; there existed therefore, an excess of vinyltrimethoxysilane, this excess not being compensated for by the presence of at least one volatile alcohol.

After a reaction time of 1 hour at a temperature of 25° C., it was found that the silanol groups had disappeared, but the viscosity of the polymer obtained at 25° C. was 50,000 mPa.s, which was confirmed by the number-average molecular weight of said polymer: $\overline{M}n=59,000$.

COMPARATIVE EXAMPLE 8:

The procedure was as in Example 1, but using the following amount of reagents:

(i) 100 g of $\alpha,\omega$-dihydroxypolydimethylsiloxane,
(ii) 5 g (0.034 mol) of vinyltrimethoxysilane (excess), and
(iii) 0. 0110 g (0.0002 mol) of potassium hydroxide.

After a reaction time of 1 hour at 25° C., the mixture was neutralized with 0.107 g of silyl phosphate (12.5% of phosphoric acid).

The polymer obtained had a viscosity $\eta$ of 6,400 mPa.s at 25° C.

EXAMPLE 9:

The procedure was as in Comparative Example 8, but adding 5 g (0.034 mol) of methanol to the reaction mixture.

After a reaction time of 1 hour, the polymer obtained had a viscosity $\eta$ of 104,000 mPa.s at 25° C. and was devoid of silanol groups.

COMPARATIVE EXAMPLE 10:

The procedure was as in Example 1, but using the following amounts of reagents:
(i) 100 g of $\alpha,\omega$-dihydroxypolydimethylsiloxane,
(ii) 2.5 g (0.017 mol) of vinyltrimethoxysilane (excess), and
(iii) 0.0110 g (0.002 mol) of potassium hydroxide.

After a reaction time of 1 hour at 25° C., the mixture was neutralized with 0.107 g of silyl phosphate (12.5% of phosphoric acid).

The polymer obtained had a viscosity $\eta$ of 20,000 mPa.s at 25° C.

EXAMPLE 11:

The procedure was as in Comparative Example 10, but adding 2.5 g (0.054 mol) of ethanol, of formula $C_2H_5OH$, to the reaction mixture.

The polymer obtained had a viscosity $\eta$ of 92,000 mPa.s at 25° C. and was devoid of silanol groups.

EXAMPLE 12:

The procedure was as in Comparative Example 10, but adding 5 g (0.083 mol) of propan-2-ol to the reaction mixture.

The polymer obtained had a viscosity $\eta$ of 85,000 mPa.s at 25° C. and was devoid of silanol groups.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a straight-chain diorganopolysiloxane containing at least one alkoxy group bonded to a silicon atom at each end of its polymer chain, comprising reacting, in the presence of a catalytically effective amount of sodium hydroxide or potassium hydroxide,
   (a) 100 parts by weight of at least one straight-chain diorganopolysiloxane containing a hydroxyl group bonded to a silicon atom at each end of its polymer chain, with
   (b) 0.35 to 6 parts by weight of at least one polyalkoxysilane of the formula:

$$(R^4)_c(R^1)_a Si(OR^2)_{4-(a+c)} \tag{1}$$

in which a is 0, 1 or 2; c is 0, 1 or 2; a+c is 0, 1 or 2; $R^1$ is a substituted or unsubstituted, saturated or unsaturated, $C_1$ to $C_{13}$ aliphatic, cycloalkyl or aromatic monovalent hydrocarbon radical, which may comprise an epoxy, primary, secondary or tertiary amine or mercapto group; the radicals $R^2$, which may be identical or different, are each an aliphatic radical having from 1 to 8 carbon atoms, or an aralkyl radical having from 7 to 13 carbon atoms; and $R^4$ is a substituted or unsubstituted, saturated or unsaturated, $C^1$ to $C_{13}$ aliphatic, cycloalkyl or aromatic monovalent hydrocarbon radical, with the proviso that $R^4$ may be identical to $R^1$ and with (c) 0.5 to 15 parts by weight of at least one alcohol which is added prior to reacting (a) with (b), to yield a straight chain diorganopolysiloxane being viscosity-stable and devoid of silanol groups.

2. The process as defined by claim 1, comprising reacting (c) 2 and 5 parts by weight of at least one lower alkanol.

3. A process for the preparation of a straight-chain diorganopolysiloxane containing at least one alkoxy group bonded to a silicon atom at each end of its polymer chain, comprising reacting, in the presence of a catalytically effective amount of sodium hydroxide or potassium hydroxide, (a) one mole of at least one diorganopolysiloxane containing a hydroxyl group bonded to a silicon atom at each end of its polymer chain, with (b) 2 to 6 moles of at least one polyalkoxysilane of the formula:

$$(R^4)_c(R^1)_aSi(OR^2)_{4-(a+c)} \qquad (1)$$

in which a is 0, 1 or 2; c is 0, 1 or 2; a+c is 0, 1 or 2; $R^1$ is a substituted or unsubstituted, saturated or unsaturated, $C_1$ to $C_{13}$ aliphatic, cycloalkyl or aromatic monovalent hydrocarbon radical; the radicals $R^2$ which may be identical or different, are each an aliphatic radical having from 1 to 8 carbon atoms, or an aralkyl radical having from 7 to 13 carbon atoms; and $R^4$ is a substituted or unsubstituted, saturated or unsaturated, $C_1$ to $C_{13}$ aliphatic, cycloalkyl or aromatic monovalent hydrocarbon radical, with the proviso that $R^4$ may be identical to $R^1$, the mole ratio range of 1:2 to 1:6 being present prior to reacting (a) with (b), to yield a straight chain diorganopolysiloxane being viscosity-stable and devoid of silanol groups.

4. The process as defined by claim 3, wherein said sodium hydroxide or potassium hydroxide is in solution in an alcohol.

5. The process as defined by claims 1 or 3, carried out in the presence of from 0.001 to 5 moles of sodium hydroxide or potassium hydroxide per one mole of silanol group $\equiv$SiOH in the diorganopolysiloxane.

6. The process as defined by claims 1 or 3, carried out at a temperature ranging from $-10°$ C. to $90°$ C.

7. The process as defined by claims 1 or 3, said straight-chain diorganopolysiloxane containing at least one alkoxy group at each end of its polymer chain having the formula:

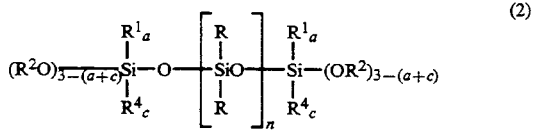

and said straight-chain diorganopolysiloxane containing a hydroxyl group at each end of its polymer chain having the formula:

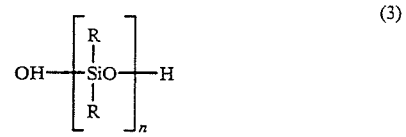

in which the radicals R, which may be identical or different, are each a monovalent hydrocarbon radical having from 1 to 10 carbon atoms, optionally substituted by halogen atoms or cyano groups, and n is a number having a value such that the diorganopolysiloxanes of formulae (2) and (3) have a viscosity of 25 to 1,000,000 mPa.s at 25° C.

8. The process as defined by claim 7, wherein formulae (2) and (3), R is a methyl, phenyl, vinyl or trifluoropropyl radical.

9. The process as defined by claims 1 or 3, said polyalkoxysilane of formula (1) comprising methyltrimethoxysilane, methyltriethoxysilane, vinyltrimethoxysilane, tetraethoxysilane, vinyltriethoxysilane or methylvinyldimethoxysilane.

10. The process as defined by claims 1 or 3, comprising neutralizing said sodium hydroxide or potassium hydroxide upon completion thereof.

11. The process as defined in claim 10, comprising neutralizing said sodium hydroxide or potassium hydroxide with silyl phosphate.

12. A process for the preparation of a straight chain diorganopolysiloxane containing at least one alkoxy group bonded to a silicon atom at each end of its polymer chain, by reacting (a) one mole of at least one straight chain diorganopolysiloxane containing a hydroxyl group bonded to a silicon atom at each end of its polymer chain, with (b) 2 to 6 moles of at least one polyalkoxysilane of the formula:

$$(R^4)_c(R^1)_aSi(OR^2)_{4-(a+c)} \qquad (1)$$

in which a is 0, 1 or 2; c is 0, 1 or 2; a+c is 0, 1 or 2; $R^1$ is a substituted or unsubstituted, saturated or unsaturated, $C_1$ to $C_{13}$ aliphatic, cycloalkyl or aromatic monovalent hydrocarbon radical, which may comprise an epoxy, primary, secondary or tertiary amine or mercapto group; the radicals $R^2$, which may be identical or different, are each an aliphatic radical having from 1 to 8 carbon atoms, or an aralkyl radical having from 7 to 13 carbon atoms; and $R^4$ is a substituted or unsubstituted, saturated or unsaturated, $C_1$ to $C_{13}$ aliphatic, cycloalkyl or aromatic monovalent hydrocarbon radical, with the proviso that $R^4$ may be identical to $R^1$, wherein the process comprises conducting the reaction in the presence of a catalytically effective amount of a catalyst consisting of sodium hydroxide or potassium hydroxide, and neutralizing the reaction mixture after the desired reaction but prior to the occurrence of polymer rearrangements.

13. A process according to claim 12, wherein the catalyst is potassium hydroxide in solution in methanol.

14. A process according to claim 12, wherein the neutralization is carried out using an effective amount of a component selected from the group consisting of trichloroethylphosphate, dimethylvinyl silyl acetate, and silyl phosphate.

* * * * *